(No Model.) 2 Sheets—Sheet 1.
G. DE LAVAL.
COMBINED STEAM AND POWER PUMP.
No. 528,783. Patented Nov. 6, 1894.
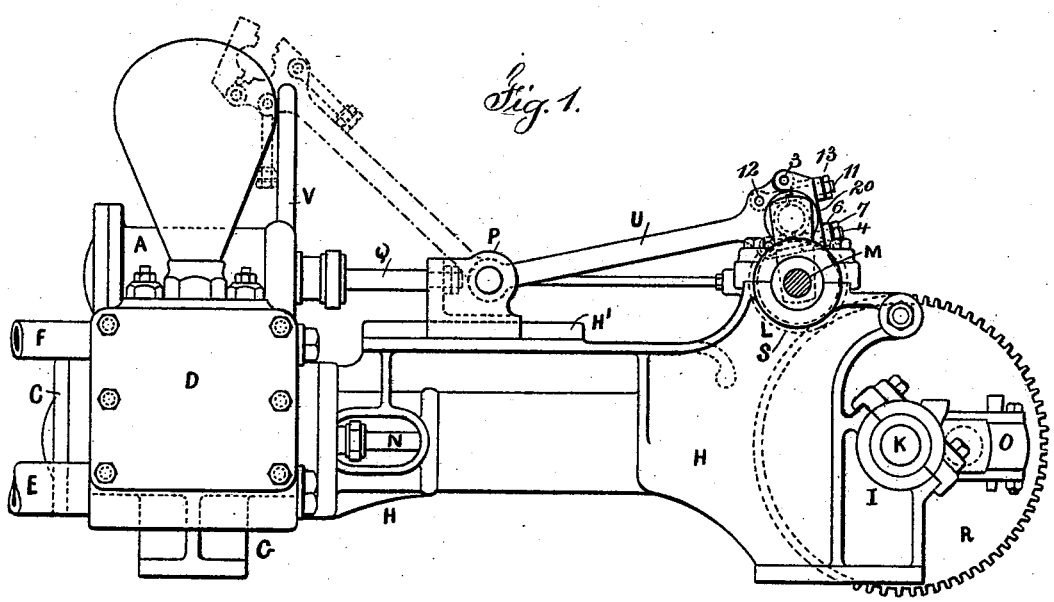
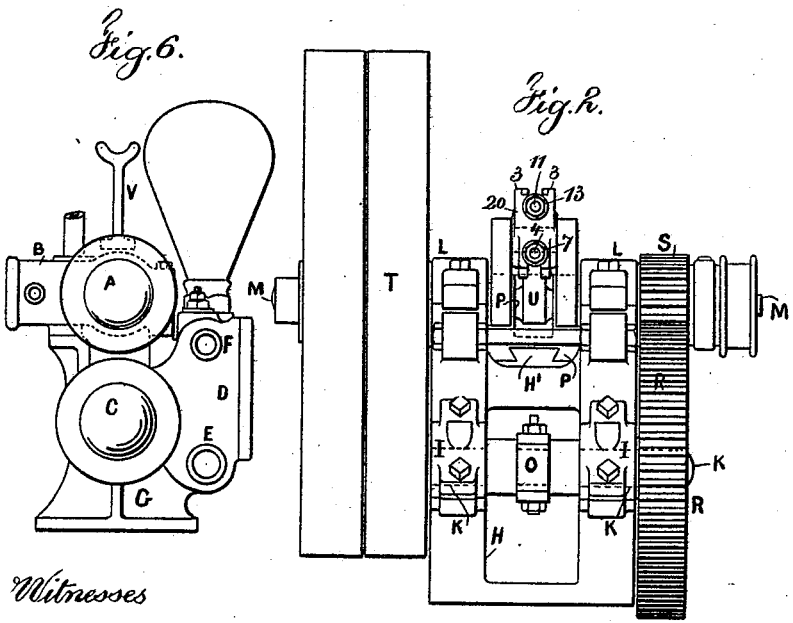
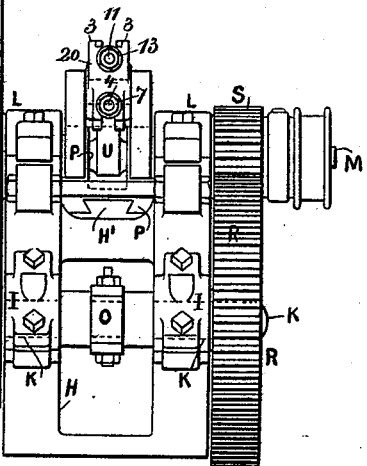
Witnesses
Chas H Smith
J. Staib
Inventor
George de Laval
per Lemuel W. Serrell
Atty (No Model.) 2 Sheets—Sheet 2.
G. DE LAVAL.
COMBINED STEAM AND POWER PUMP.
No. 528,783. Patented Nov. 6, 1894.
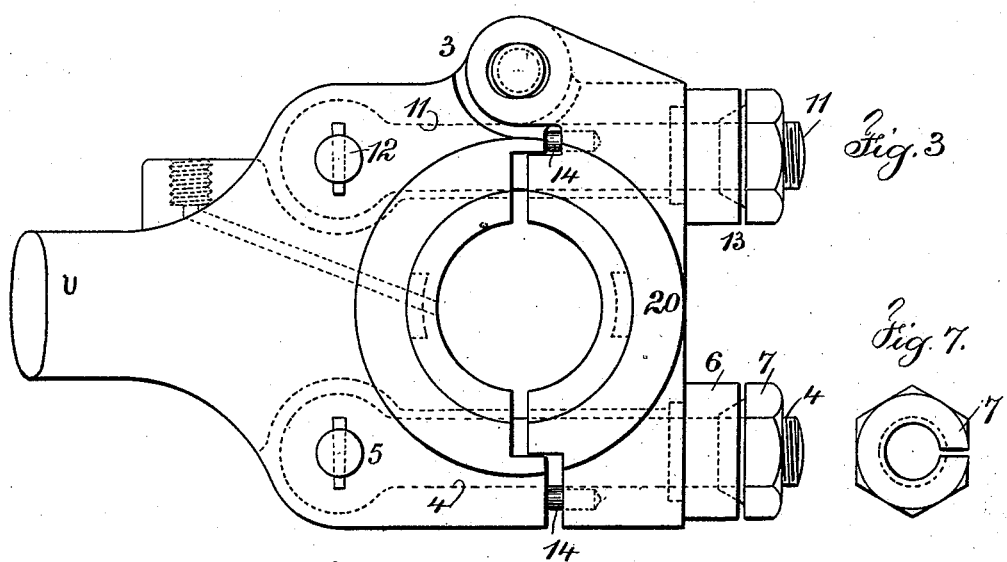
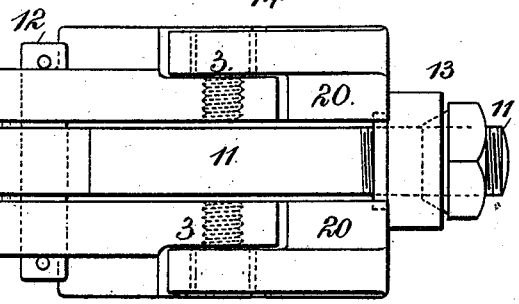
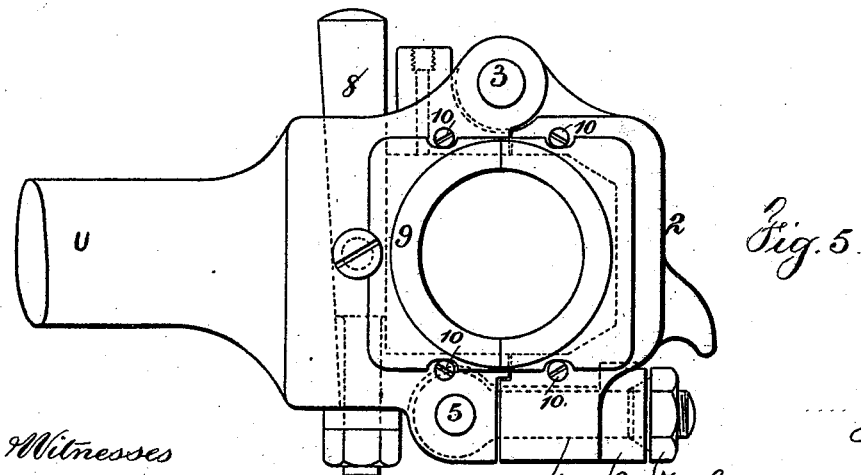

UNITED STATES PATENT OFFICE.

GEORGE DE LAVAL, OF WARREN, MASSACHUSETTS, ASSIGNOR TO THE GEO. F. BLAKE MANUFACTURING COMPANY, OF NEW YORK, N. Y.

COMBINED STEAM AND POWER PUMP.

SPECIFICATION forming part of Letters Patent No. 528,783, dated November 6, 1894.

Application filed May 22, 1894. Serial No. 512,049. (No model.)

*To all whom it may concern:*

Be it known that I, GEORGE DE LAVAL, a citizen of the United States, residing at Warren, in the county of Worcester and State of Massachusetts, have invented an Improvement in a Combined Steam and Power Pump, of which the following is a specification.

In mills and factories a pump is often required to be run both day and night, especially in instances where the pump is used in connection with moistening plants in cotton and other mills, and when the shafting is running in the daytime it is most economical and advantageous to run the pump by a belt, but at night when the shafting is stopped the pump requires its own steam engine. To meet this demand of the trade pumps have been made with the steam engine cylinder in line with the water cylinder, there being a detachable coupling between the piston rods of the respective cylinders. This arrangement however makes the engine and pump of considerable length in addition to requiring a long bed plate that reaches to the pillar blocks supporting the crank shaft to which the belt pulley is applied.

In my present improvement the belt pulley forms a fly wheel for the crank shaft of the engine, and the shaft carries a pinion that drives a gear wheel upon the crank shaft of the pump, and the engine connecting-rod is detachable from the crank of its shaft in order that the said connecting rod may de disconnected and laid back out of the way when the belt is used to drive the pump, and when the belt is thrown off or shifted to the loose pulley the connecting rod of the engine is reconnected to its crank so as to drive the pump by the engine, and the engine is located above the water cylinder so that the pump is not warmed thereby, and the two cylinders are placed in such a position relatively, one to the other, that but one frame is required for the cross head of the pump and the cross head of the engine, thus rendering the engine and pump very compact and easily changed for the pump to be driven directly by the engine or by a belt to the shafting.

In carrying out my invention I make use of a peculiar separable box for the end of the rod that connects with the engine crank.

In the drawings, Figure 1 is an elevation representing the engine and pump. Fig. 2 is an end view of the same. Fig. 3 represents the separable box for the end of the connecting rod. Fig. 4 is a plan view of the same. Fig. 5 is a modification of the separable box adapted to larger sizes of engines. Fig. 6 is an end view in smaller size of the engine and pump cylinders, and Fig. 7 is an elevation of one of the split jam nuts.

The steam cylinder A and its valve and valve chest B are to be of any desired size and character, and the pump cylinder C is provided with a valve chest D and with a suction pipe E and discharge pipe F. These parts are of any desired character and do not require further description. I however remark that the steam cylinder A is above the pump cylinder C and they are bolted together, so that the pump cylinder C supports the steam cylinder A, and it is advantageous to interpose non-conducting material such as vulcanized fiber to prevent the heat of the steam cylinder being conducted to the water cylinder.

The water cylinder C is supported upon a suitable base or bed plate G, and the frame H is connected at one end to the water cylinder and steam cylinder respectively and extends to and supports the pillar block I for the crank shaft K, and such frame also receives and supports the bearing or pillar block L for the engine crank shaft M.

The cross head for the piston rod N of the pump and the connecting rod O to the crank of the shaft K are of any desired character, and upon the frame H are suitable slides for the cross head of the piston N. These however are not represented in the drawings.

Upon the top portion of the frame H are the slides H' for the cross head P of the piston rod Q of the engine cylinder; and it will be apparent that by constructing the cross head in the manner shown so that it rises above the slides H', the weight of the frame is lessened and it is rendered more compact.

Upon the shaft K is a gear wheel R, and upon the shaft M is a gear wheel or pinion S, and the driving pulley T, forms a fly wheel for the engine shaft, and it receives a driving belt from any suitable shaft, so that when the shafting is running, the pump can be driven through the pulley T, gears S and R, rotating the crank shaft K and actuating the pump, but when the driving shaft is not in operation, the belt is either slipped off the pulley T or shifted to an adjacent loose pulley so that the engine can be employed in driving the pump through the shaft M and gearing.

In order to disconnect the engine, the connecting rod U is separated from the crank of the shaft M, and the connecting rod is turned back out of the way. Preferably it is swung over to a support V upon the engine cylinder, and to facilitate this operation the box at the end of the connecting rod is separable; that is to say, the outer half 2 of the box is united by hinges 3 to the forked end of the connecting rod, and a bolt 4 having an eye at one end through which the pivot pin 5 passes is employed for confining the swinging end of the outer half 2 of said box in place.

The bolt 4 is within a longitudinal channel on the under side of the box, so that by loosening the nuts 6 and 7 the bolt can be swung down out of the way and then the box can be swung upon its pivot or hinges 3 in separating the connecting rod from the crank, and it is advantageous to make the surface of the nut 7 which comes in contact with the nut 6, conical as shown, there being a similar recess in the nut 6, so that the nut 7 becomes a jam nut to prevent the parts becoming loose. The jam nut 7 is split, as shown in Fig. 7.

In large sized engines I prefer to make use of the key 8 passing across through the end of the connecting rod to set up the box 9 and compensate wear, such key 8 being made with a screw threaded nut to hold it in position as usual, and the screws 10 serve to prevent the box 9 from dropping out of its place when the connecting rod is swung back, and similar screws are applied to the box or bearing in the outer half 2 of the separable box, and in this form of separable box the nuts of the bolt 4 will be screwed up until the swinging half 2 of the separable box is screwed up tightly against the end of the connecting rod. In cases however where a separable box is made use of that is lined with Babbitt metal, it is not necessary to make use of the key 8, the parts being made in the form represented in Figs. 1, 3 and 4, and in this case the hinges 3 are double so that a groove can be made between them for the bolt 11 which is pivoted at 12 and provided with nuts 13 so as to set up the outer swinging half 20 of the box, the hinges being made sufficiently loose to allow for setting up the box properly upon the crank, and there are preferably pins 14 that project from the swinging half 20 and bear against the ends of the connecting rod to prevent the box being screwed up tightly upon the crank, and these pins 14 can be filed off from time to time if necessary as the metal of the box may wear upon the crank pin.

I am aware that the steam engine has been placed above the pump and geared to the crank of the pump, and that connecting rods have been made with separable journal boxes. Hence I do not claim either part separately.

In my improvement the belt pulley becomes the fly wheel when the belt is thrown off.

The engine can be detachable from the pump by separating the connecting rod from its crank and the rod is supported out of the way of the crank when the engine is not in use, and the cross head of the engine extending down to the slides on the frame allows for the frame being much lighter than heretofore.

I claim as my invention—

1. The combination with a pump cylinder and its driving crank and connecting rod, of a frame having a pillar block for the crank shaft, a second crank shaft supported by a pillar block on the frame, a steam cylinder and connections between the same and the cylinder of the pump, a piston rod and cross head moving upon slideways upon the frame, a connecting rod extending from the cross head to the crank shaft and having a separable box for disconnecting the rod from the crank, a driving pulley upon the engine crank shaft for a belt, a pinion upon the engine crank shaft, and a gear wheel upon the crank shaft of the pump, whereby the pump can be driven by the belt when the connecting rod of the engine is separated from its crank shaft, or be driven from the engine when the belt is disconnected, substantially as set forth.

2. The combination with a pump and an engine cylinder, crank and gearing for driving the pump, of a connecting rod for the engine having a two-part box, a hinge for connecting the movable portion of the box to the end of the rod, a pivoted bolt within a groove in the connecting rod, and a nut for clamping the hinged portion of the separable box when the same is closed against the crank pin, substantially as set forth.

3. The combination with a pump and an engine cylinder, crank and gearing for driving the pump, of a connecting rod for the engine having a two-part box, a hinge for connecting the movable portion of the box to the end of the rod, a pivoted bolt within a groove in the connecting rod, a nut for clamping the hinged portion of the separable box when the same is closed against the crank pin, and a key for setting up the movable brass or bearing at the end of the connecting rod, substantially as set forth.

4. The combination with a pump cylinder and its driving crank and connecting rod, of a frame having a pillar block for the crank shaft, a second crank shaft supported by a pillar block on the frame, a steam cylinder and connections between the same and the cylinder of the pump, a piston rod and cross head moving upon slideways upon the frame, a connecting rod extending from the cross head to the crank shaft and having a separable box for disconnecting the rod from the crank, a driving pulley upon the engine crank shaft for a belt, and an adjacent loose pulley, a pinion upon the engine crank shaft, and a gear wheel upon the crank shaft of the pump, whereby the pump can be driven by the belt when the connecting rod of the engine is separated from its crank shaft, or be driven from the engine when the belt is on the loose pulley, substantially as set forth.

Signed by me this 10th day of May, 1894.

GEO DE LAVAL.

Witnesses:
 GEORGE P. ABORN,
 FRED E. COOK.